US012634313B2

(12) United States Patent
Di Pietro et al.

(10) Patent No.: US 12,634,313 B2
(45) Date of Patent: May 19, 2026

(54) USING CASCADED DETECTORS FOR PRIORITIZING AND OPTIMIZING DATA EXPORTS

(71) Applicant: Cisco Technology, Inc., San Jose, CA (US)

(72) Inventors: Andrea Di Pietro, Frejus (FR); Sofia Karygianni, Dubendorf (CH); Sukrit Dasgupta, Norfolk, MA (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 18/126,706

(22) Filed: Mar. 27, 2023

(65) Prior Publication Data

US 2024/0333732 A1     Oct. 3, 2024

(51) Int. Cl.
H04L 9/40 (2022.01)

(52) U.S. Cl.
CPC ...... H04L 63/1425 (2013.01); H04L 63/0245 (2013.01)

(58) Field of Classification Search
None
See application file for complete search history.

(56) References Cited

U.S. PATENT DOCUMENTS

| | | | |
|---|---|---|---|
| 10,237,300 B2 | 3/2019 | Gazit et al. | |
| 10,432,661 B2 | 10/2019 | Vasseur et al. | |
| 10,552,763 B2 | 2/2020 | Weibel et al. | |
| 10,616,256 B2 | 4/2020 | Kursun et al. | |
| 11,146,581 B2 | 10/2021 | Lotem et al. | |
| 11,595,268 B2 | 2/2023 | Fenoglio et al. | |
| 12,061,516 B2 * | 8/2024 | Juneja | G06N 5/025 |
| 2017/0279685 A1 | 9/2017 | Mota et al. | |
| 2017/0279838 A1 * | 9/2017 | Dasgupta | H04L 63/1425 |
| 2021/0204152 A1 | 7/2021 | Vasudevan et al. | |
| 2023/0325292 A1 * | 10/2023 | Ardel | G05B 23/0254 |

* cited by examiner

*Primary Examiner* — Syed A Roni
(74) *Attorney, Agent, or Firm* — Lee & Hayes, P.C.

(57) ABSTRACT

In one embodiment, a device detects an anomaly in the network based on telemetry data obtained by the device. The device computes an anomaly detection score associated with the anomaly. The device determines that the anomaly should be reported based on its anomaly detection score and in accordance with a configured reporting policy. The device reports anomaly information regarding the anomaly to a cloud-hosted detection engine that evaluates the anomaly information to confirm the anomaly detected by the device.

20 Claims, 10 Drawing Sheets

USING CASCADED DETECTORS FOR PRIORITIZING AND OPTIMIZING DATA EXPORTS

TECHNICAL FIELD

The present disclosure relates generally to computer networks, and, more particularly, to using cascaded detectors for prioritizing and optimizing data exports.

BACKGROUND

As machine learning techniques continue to advance, recent efforts have concentrated on using machine learning to monitor computer networks. For instance, analyzing the traffic in the network can aid in detecting network attacks, misconfigured or malfunctioning networking devices, and other such conditions.

A key challenge with respect to using machine learning to monitor a computer a computer network relates to the amount of data that a machine learning model analyzes and its predictive power. More specifically, collecting and reporting a large amount of input data for a machine learning model consumes increased resources, both from a bandwidth perspective as well as the computing resources of the device(s) associated with the collection and reporting of the data. In addition, the greater the performance of the model, the more computing resources are consumed by the executing device, as well.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
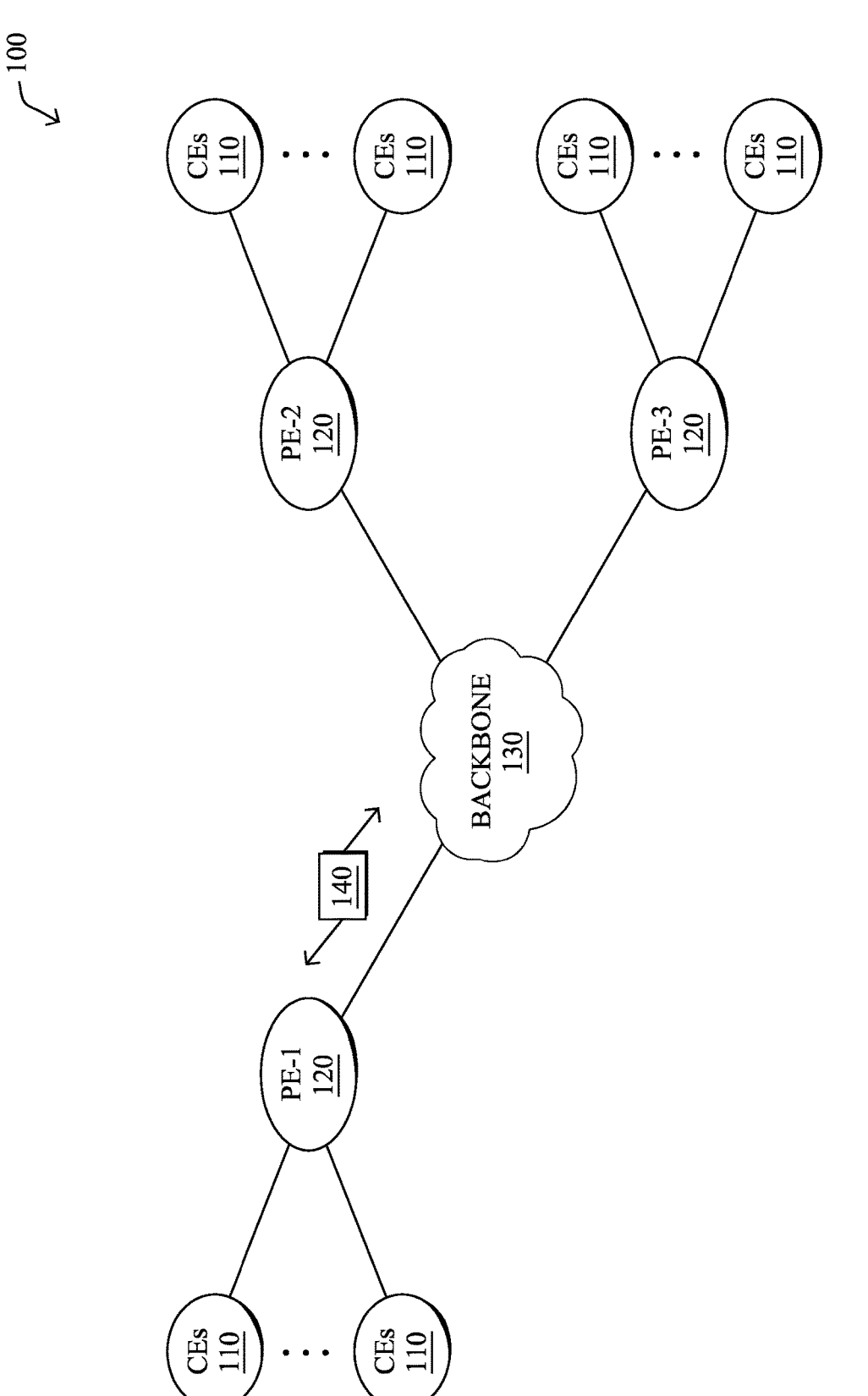
FIGS. 1A-1B illustrate an example communication network.

According to one or more embodiments of the disclosure, a device detects an anomaly in the network based on telemetry data obtained by the device. The device computes an anomaly detection score associated with the anomaly. The device determines that the anomaly should be reported based on its anomaly detection score and in accordance with a configured reporting policy. The device reports anomaly information regarding the anomaly to a cloud-hosted detection engine that evaluates the anomaly information to confirm the anomaly detected by the device.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
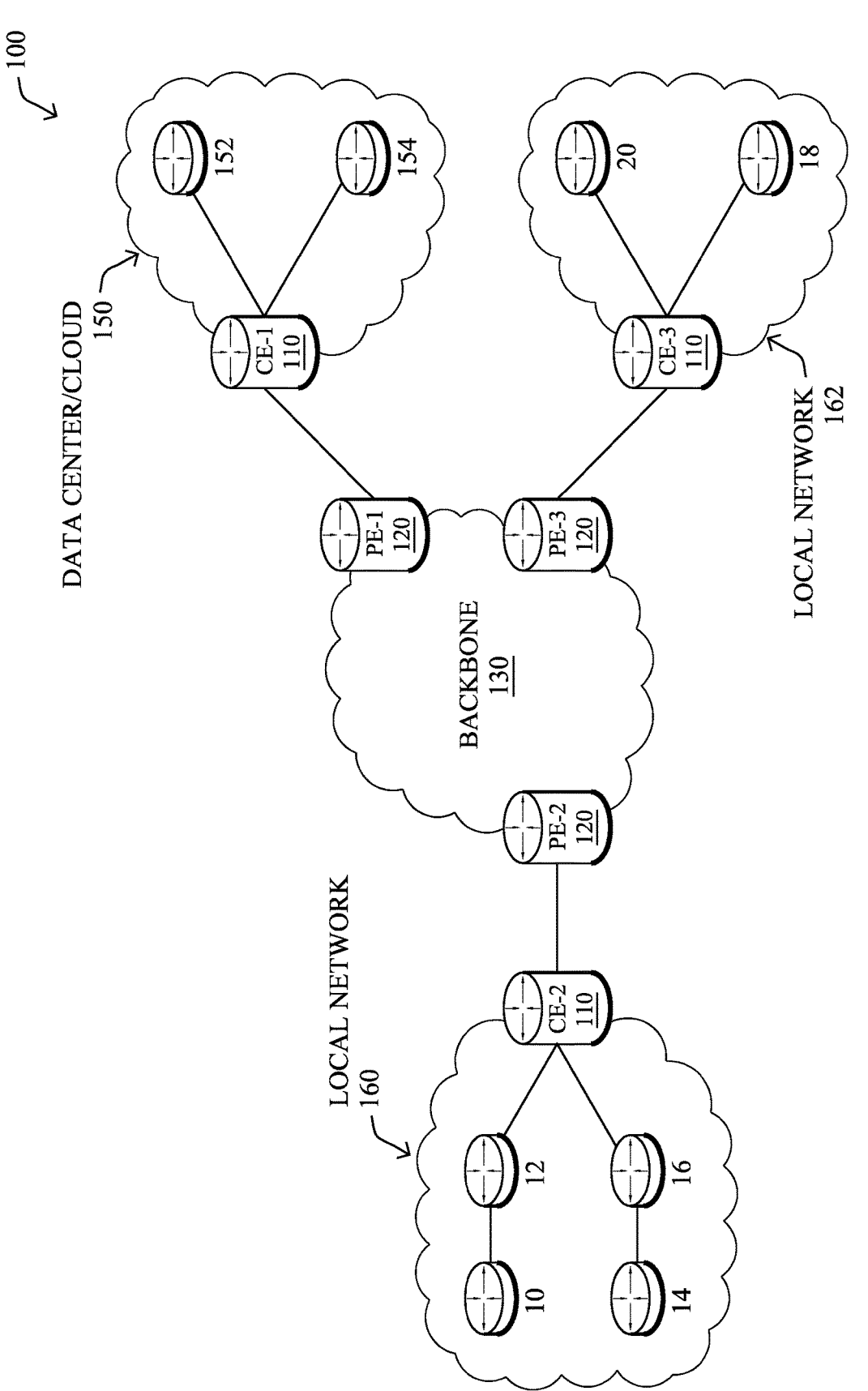

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
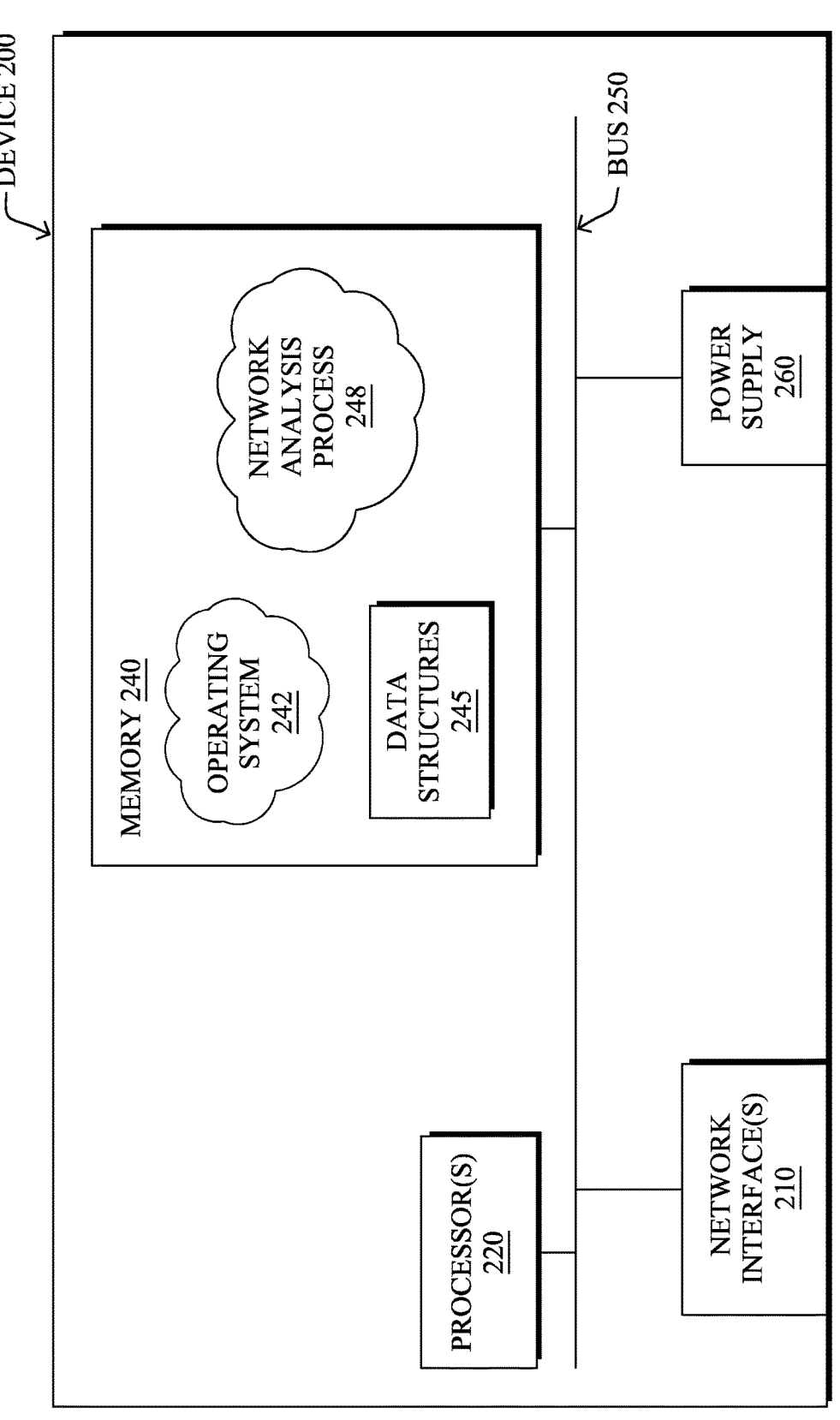
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network analysis process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, network analysis process 248 may include computer executable instructions that, when executed by processor(s) 220, cause device 200 to perform the techniques described herein. To do so, in some embodiments, network analysis process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of a particular traffic pattern or other device behavior. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the device. Semi-supervised learning models take a middle ground approach that uses a greatly reduced set of labeled training data.

Example machine learning techniques that network analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly determined that a behavior in the network is anomalous. Conversely, the false negatives of the model may refer to the number of times the model failed to identify such a behavior as anomalous. True negatives and positives may refer to the number of times the model correctly identified normal behavior or anomalous behavior, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, as machine learning techniques continue to advance, recent efforts have concentrated on using machine learning to monitor computer networks. For instance, analyzing the traffic in the network can aid in detecting network attacks, misconfigured or malfunctioning networking devices, and other such conditions.

A key challenge with respect to using machine learning to monitor a computer a computer network relates to the amount of data that a machine learning model analyzes and its predictive power. More specifically, collecting and reporting a large amount of input data for a machine learning model consumes increased resources, both from a bandwidth perspective as well as the computing resources of the device(s) associated with the collection and reporting of the data. In addition, the greater the performance of the model, the more computing resources are consumed by the executing device, as well.

—Using Cascaded Detectors for Prioritizing and Optimizing Data Exports—

The techniques herein allow for the selective reporting of traffic samples or other such telemetry data collected on on-premise to a cloud-hosted classifier for further inspection. In various aspects, the techniques herein may also adapt the selection to the available bandwidth and provide a user the option of setting a number of additional s reporting policies, as well.

Illustratively, the techniques described herein may be performed by hardware, software, and/or firmware, such as in accordance with network analysis process 248, which may include computer executable instructions executed by the processor 220 (or independent processor of interfaces 210) to perform functions relating to the techniques described herein.

Specifically, according to various embodiments, a device detects an anomaly in the network based on telemetry data obtained by the device. The device computes an anomaly detection score associated with the anomaly. The device determines that the anomaly should be reported based on its anomaly detection score and in accordance with a configured reporting policy. The device reports anomaly information regarding the anomaly to a cloud-hosted detection engine that evaluates the anomaly information to confirm the anomaly detected by the device.

Operationally, the techniques herein propose using a cascade of anomaly detectors in a network that successively analyze a behavior in the network (e.g., of the traffic in the network, a particular device or set of devices, etc.). In various embodiments, to reduce the resources required for such a deployment, the techniques herein introduce a first stage filter that executes on premise ("on-prem") in order to prioritize the sending of information regarding detected anomalies to a more powerful, resource intensive detector in the cloud. Such a goal is achieved through a hybrid architecture whose components are located both in the cloud and on premise. In greater detail, in various embodiments, a first classifier/anomaly detector is run on-premise, while a more powerful classifier is run in the cloud.

Figure 3:
FIG. 3 illustrates an example architecture for using cascaded detectors for prioritizing and optimizing data exports.
Figure 3:
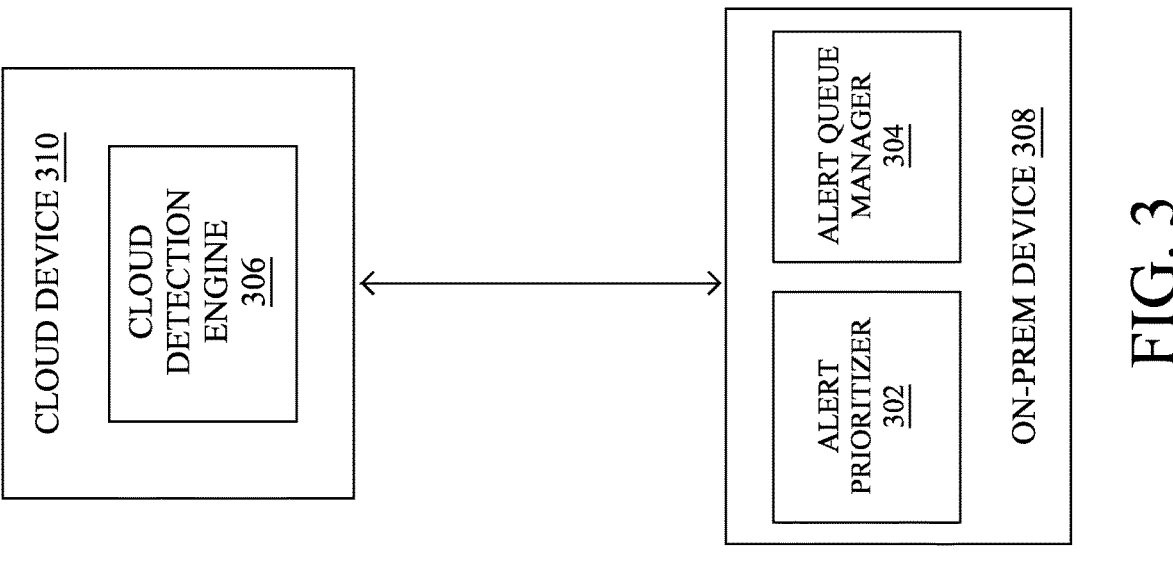

FIG. 3 illustrates an example architecture 300 for using cascaded detectors for prioritizing and optimizing data exports, according to various embodiments. As shown, architecture 300 may include an on-prem device 308, such as a router, switch, other networking device, or the like, as well as a cloud device 310 that is located in the communicates remotely with on-prem device 308 via a network (e.g., the Internet, etc.). In some embodiments, alert prioritizer 302 may include a lightweight anomaly detector when compared to that of cloud detection engine 306. Consequently, alert prioritizer 302 may also consume fewer resources than that of cloud detection engine 306 at the cost of reduced performance when compared to that of cloud detection engine 306.

In various embodiments, on-prem device 308 may execute an alert prioritizer 302 and an alert queue manager 304, while cloud device 310 may execute a cloud detection engine 306, as described in greater detail below. Such components may, for instance, be implemented through the execution of network analysis process 248. In addition, while these components are shown in architecture 300, their functionalities could be combined, omitted, or performed in a distributed manner, in various embodiments.

Figure 4A:
FIGS. 4A-4E illustrates an example of the selective reporting of data to a cloud-hosted detection engine.
Figure 4A:
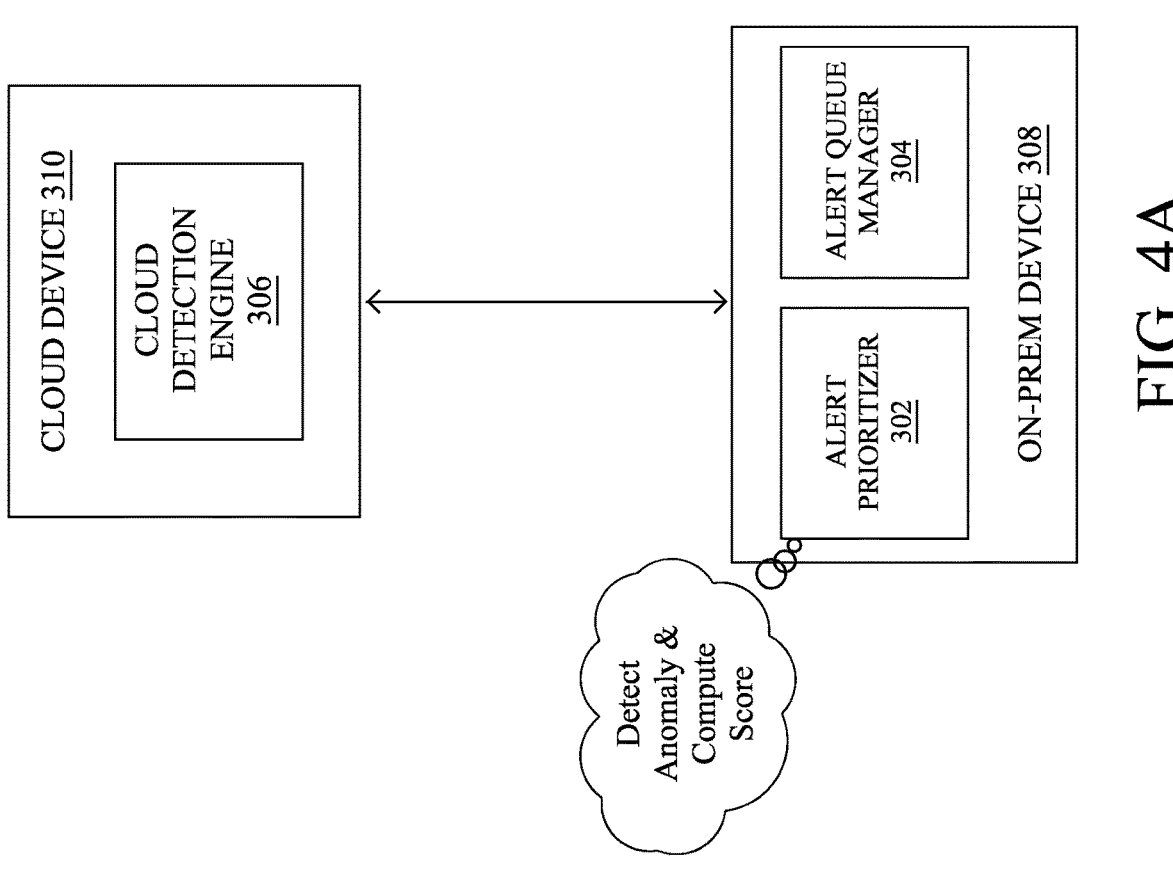

As shown in FIG. 4A, alert prioritizer 302 may take the form of a first stage anomaly detector that can be based on any suitable machine learning technique, such as an SVM, Bayesian anomaly detection, or the like. During execution, alert prioritizer 302 may take as input telemetry data obtained by on-prem device 308 either locally and/or from any number of other devices. For instance, alert prioritizer 302 may take as input Netflow data, deep packet inspection (DPI) data, classification data, firewall event data, or the like. In turn, alert prioritizer 302 may assess the telemetry data to detect anomalies, which may be indicative of network attacks, misconfigured or malfunctioning devices, or the like.

In various embodiments, alert prioritizer 302 may detect an anomaly not as a binary decision (i.e., by simply labeling the telemetry data as 'anomalous' or 'normal'), but by assigning an anomaly score to the anomalies. Such an anomaly score may be on a sliding scale, such as a value between 0-1 with the value indicating the amount of deviation of the telemetry data from a baseline and the larger the score, the more like the telemetry data is to be indicative of a true anomaly. Of course, other scales could also be used, as desired.

As would be appreciated, the definition of how an anomaly score is computed depends on the particular ML technology used. For example, if alert prioritizer 302 uses a linear SVM, it may use the output of the linear combination directly as an anomaly score. The only general requirement is for it to be representative of the distance of the observed behavior from the normal behavior.

Figure 4B:
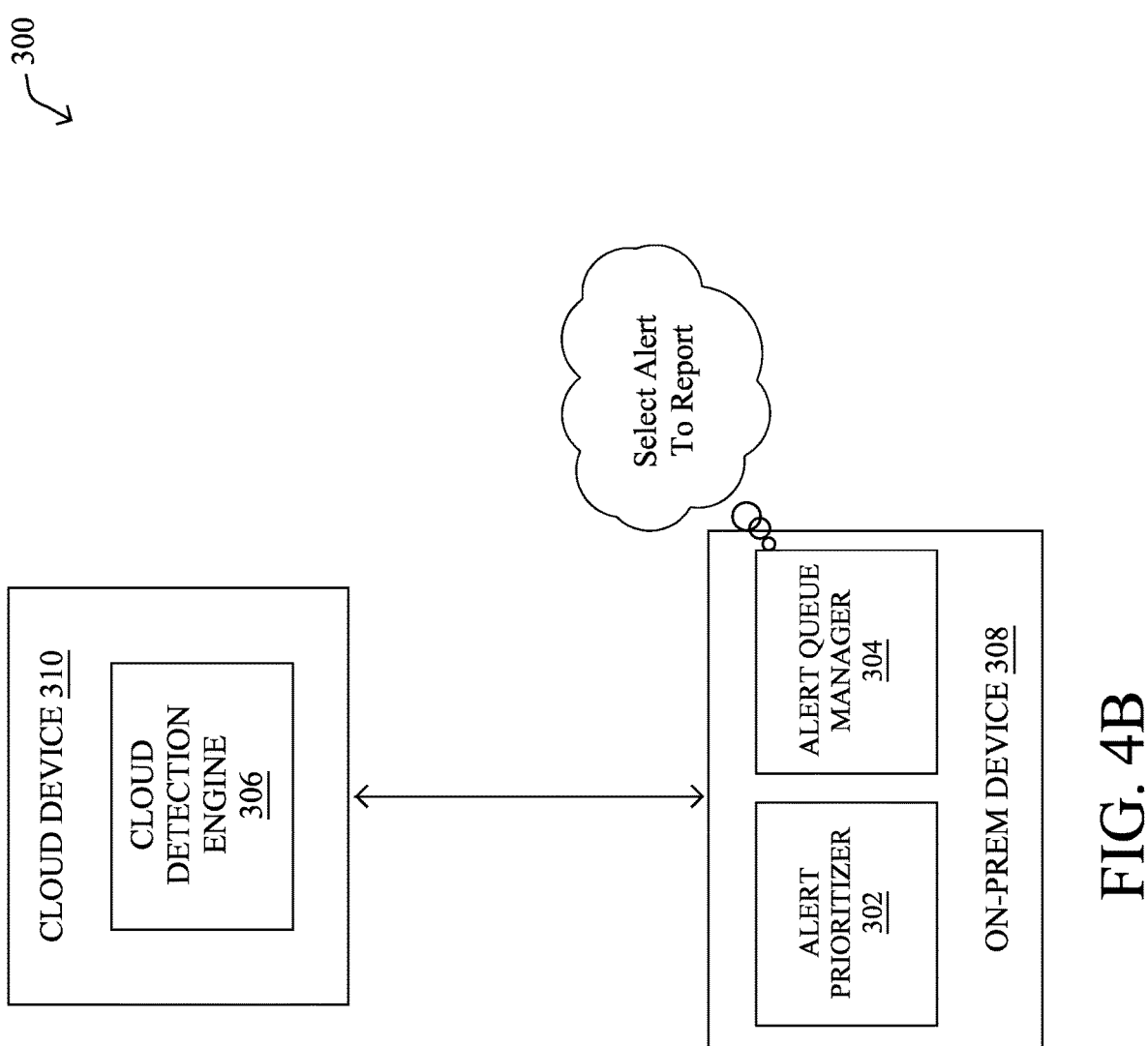

As shown in FIG. 4B, alert prioritizer 302 may provide the telemetry data, along with its anomaly score, to alert queue manager 304 for further analysis. In turn, alert queue manager 304 may assess the alert and select it for reporting to cloud detection engine 306 in the cloud, based on any number of factors. In general, alert queue manager 304 is responsible for selecting which anomaly alerts are to be sent to the cloud based on factors such as any or all of the following, among others:

An alert priority score, which may function essentially as a service class label for the reporting.

A bandwidth and/or other resource budget that limits the amount of data that alert queue manager 304 may export to the cloud during a given time interval.

There are multiple advantages to such an approach:

It ensures that, even in case of many false positives by alert prioritizer 302, the impact of exporting alerts to the cloud will never disrupt the network functionality.

It ensures that the most critical alerts are always processed by cloud detection engine 306.

It allows behaviors that do not significantly deviate from the expected behavior to also be examined by cloud detection engine 306 (e.g., if there are no high priority alerts and there is available bandwidth budget).

In various embodiments, alert queue manager 304 may select alerts to report to cloud detection engine 306 in accordance with a configured reporting policy. Such a policy may be pre-configured at on-prem device 308, set by a user via a user interface, or even pushed to on-prem device 308 by cloud detection engine 306. Note also that cloud detection engine 306 could also use such a policy for its own purposes of prioritizing alerts that are ultimately reported to a user, as well.

In some instances, the reporting policy of alert queue manager 304 may define a reporting bandwidth budget that alert queue manager 304 may take into account when deciding whether to report a given anomaly. For instance, if there is a large amount of budget left and the priority score for the alert is relatively high, alert queue manager 304 may decide to send the alert information onward to cloud detection engine 306.

Beside setting the global budget, a user may also specify specific cases in the reporting policy. For instance, the user may specify that alerts whose anomaly score exceeds a given threshold have to be sent to the cloud irrespectively of the available bandwidth. In another example, the user could also specify that alerts whose anomaly score is lower than a specific threshold must not be sent to the cloud, even if there is available bandwidth.

Various approaches could also be used to compute the priority score for a given alert, in accordance with the reporting policy. In general, the priority score may be a function of the anomaly score computed by alert prioritizer 302, but may also take into account other factors, as well. In one embodiment, for example, the reporting policy may adjust the priority score of an anomaly based on the device type(s) of the endpoint(s) associated with that anomaly. Consequently, alert queue manager 304 may favor reporting anomalies related to certain endpoints over those related to others, while still possibly also taking into account the extent of the anomalies (e.g., by still reporting anomalies associated with lower priority endpoints, if their anomaly scores are high).

Optionally, alert queue manager 304 may also communicate with external network monitoring tools like Viptela, Thousandeyes, or other path probing or monitoring services, in order to gather information about the current state of the network uplink. In turn, alert queue manager 304 could use this information to make the bandwidth budget adaptive to the current network conditions (i.e., the budget would shrink when the uplink is congested and would increase when the uplink has more available bandwidth). Such integration(s) would also allow the user to define more involved reporting policies (e.g. export only critical anomalies when the uplink is congested), as well.

Figure 4C:
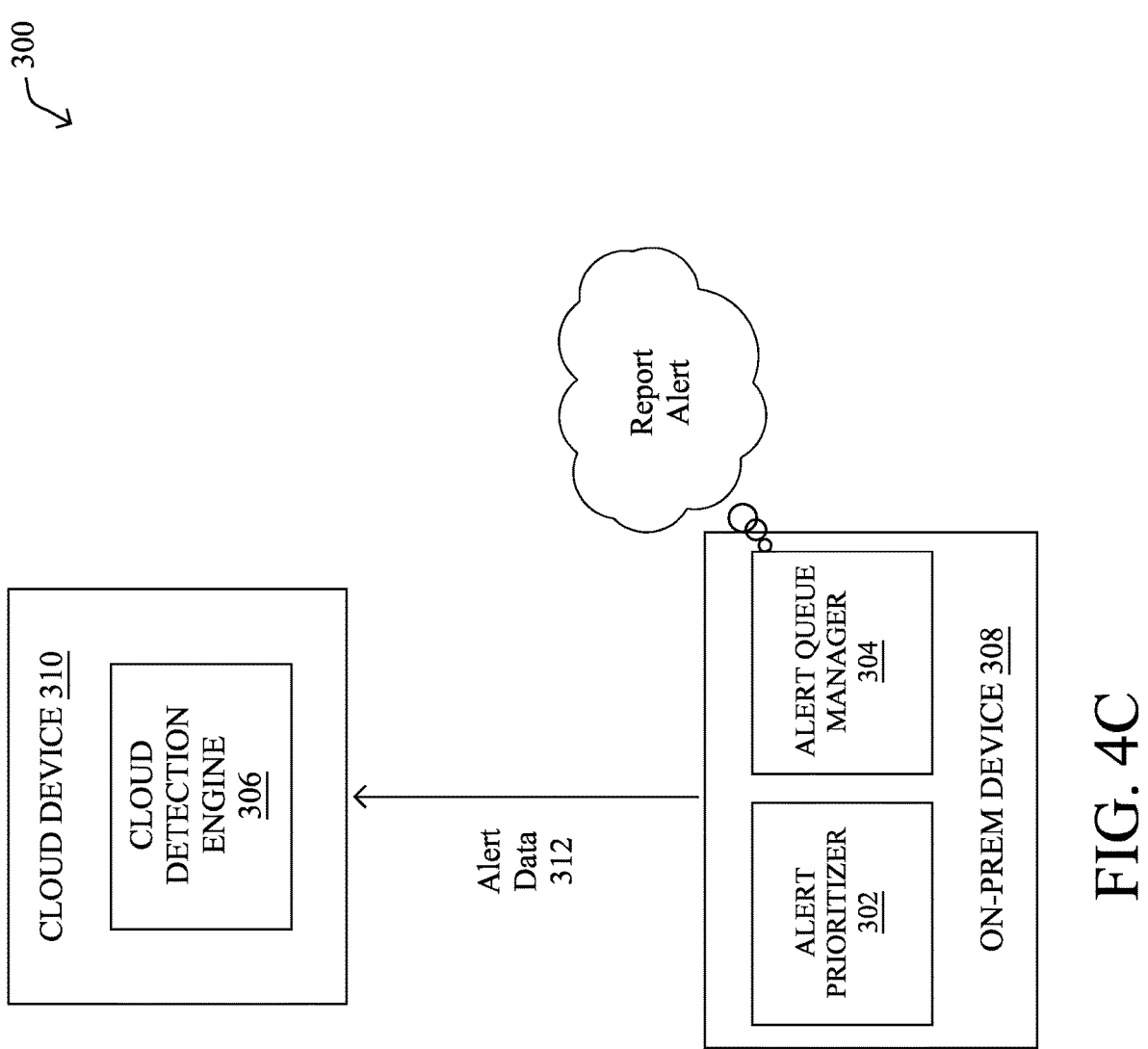

As shown in FIG. 4C, once alert queue manager 304 has selected an alert for reporting, it may then send alert data 312 via the network to cloud detection engine 306 for further analysis. In various embodiments, alert data 312 may include an indication of the anomaly detected by alert prioritizer 302 and may also include the input telemetry data to alert prioritizer 302 that led to it detecting the anomaly, or a summarization thereof.

Figure 4D:
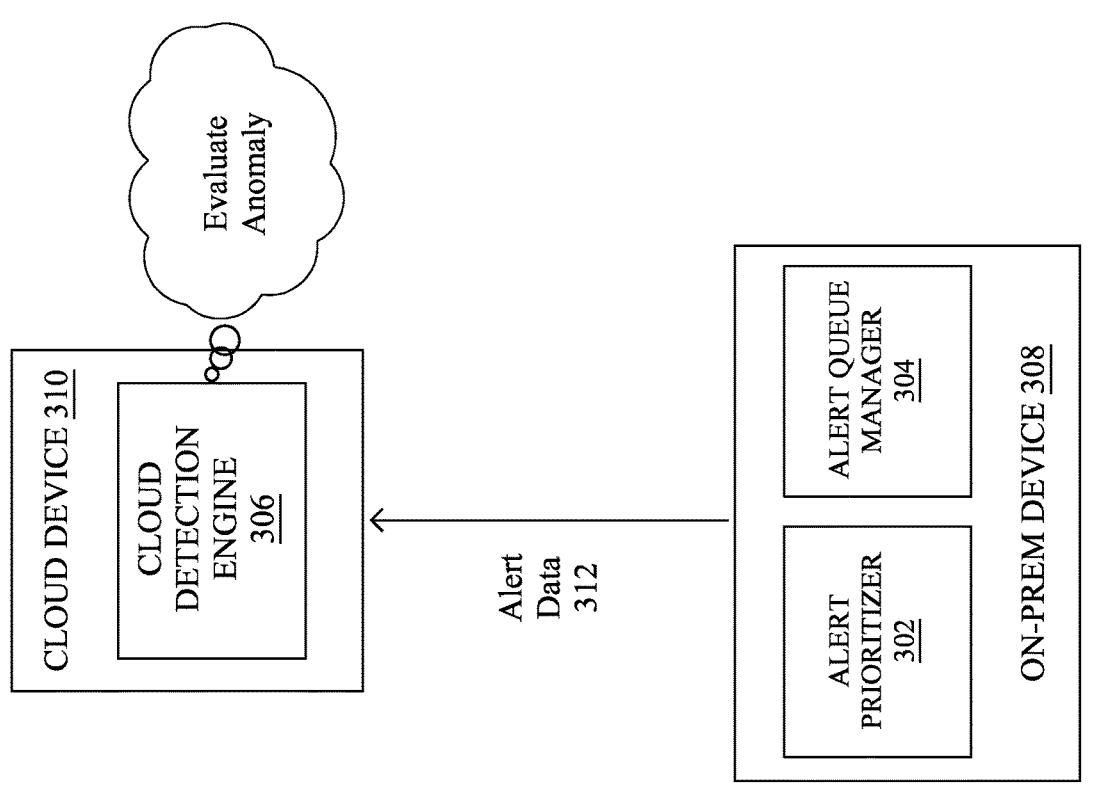

As shown in FIG. 4D, cloud detection engine 306 may then assess alert data 312 send by alert queue manager 304. In various embodiments, cloud detection engine 306 may rely on more sophisticated and resource-intensive machine learning techniques than that of alert prioritizer 302 (e.g., a deep learning-based anomaly detector or the like). Also, cloud detection engine 306 may also examine a larger amount of input behavior history than that of alert prioritizer 302, to either confirm or reject the anomaly. Cloud detection engine 306 may also provide an indication of both assessments, as well as possibly the telemetry data, to a user interface for review, especially in the case in which is the anomaly was confirmed. In further cases, cloud detection engine 306 may send a notification of a confirmed anomaly to a remediation engine in the network to take corrective measures.

Figure 4E:
Figure 4E:
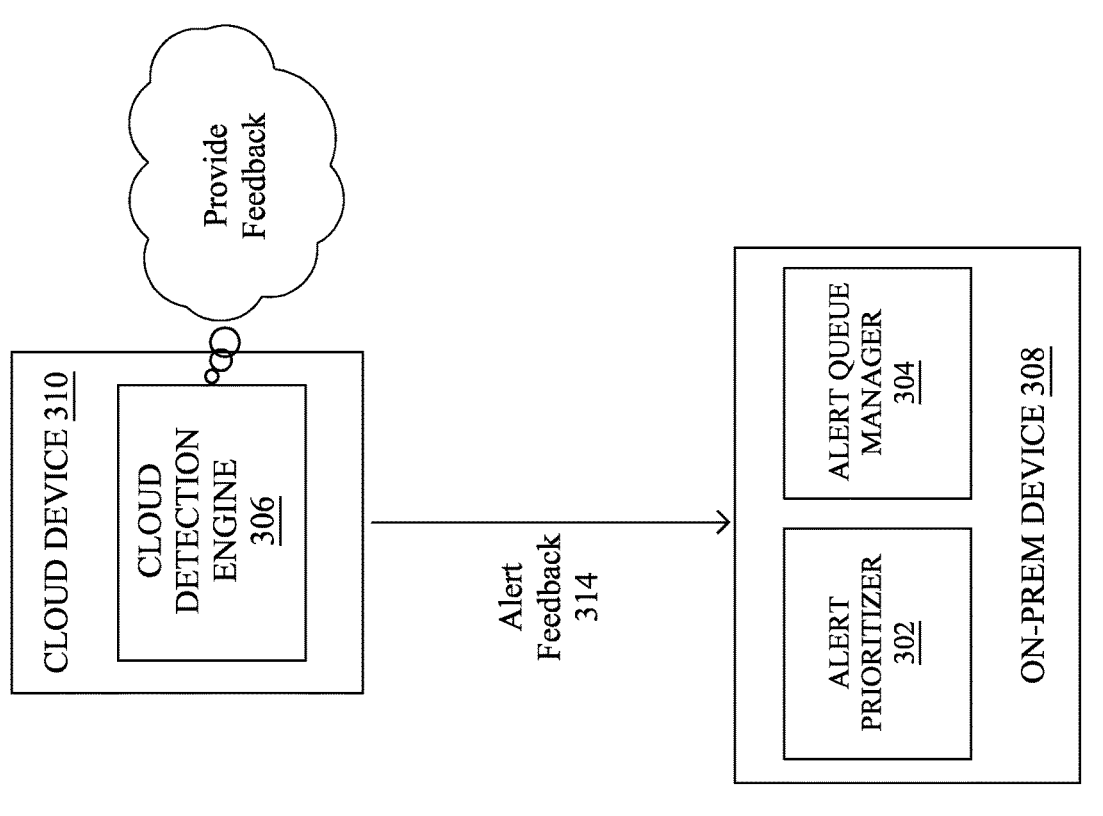

As shown in FIG. 4E, cloud detection engine 306 may also provide alert feedback 314 to on-prem device 308 regarding an anomaly that it detected. On-prem device 308 could use such feedback for purposes of reporting anomalies, adjusting the anomaly detector of alert prioritizer 302, triggering corrective measures, or the like. Additionally, cloud detection engine 306 may also send a reporting policy update to on-prem device 308 to install a specific reporting policy, either as part of alert feedback 314 or separately. It may do so in various instances such as when the output of cloud detection engine 306 is uncertain as to whether there was actually an anomaly, the updated reporting policy may specify that alert queue manager 304 should always send data for a specific endpoint, so that more visibility on that specific endpoint is provided. When the decision is made, cloud detection engine 306 can also send another update, in order to remove the specified policy. In some instances, a user can also specify whether policies from the cloud detection engine 306 are allowed to override their own, manually-specified policies.

Figure 5:
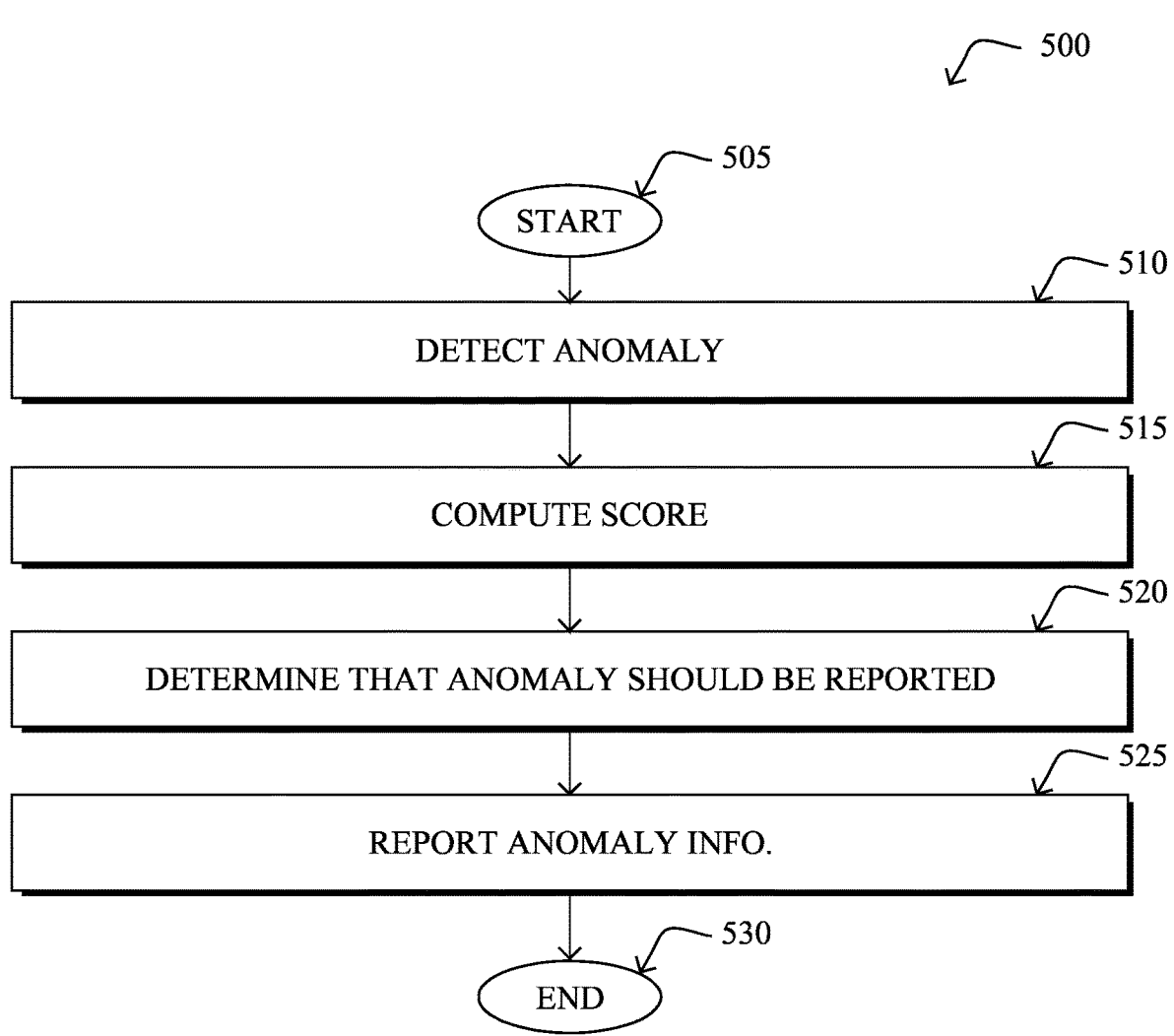
FIG. 5 illustrates an example simplified procedure for using cascaded detectors for prioritizing and optimizing data exports.

FIG. 5 illustrates an example simplified procedure 500 (i.e., a method) for using cascaded detectors for prioritizing and optimizing data exports, in accordance with one or more embodiments described herein. For example, a non-generic, specifically configured device (e.g., device 200) may perform procedure 500 by executing stored instructions (e.g., network analysis process 248). In some embodiments, the device may be a networking device, such as a router or switch. The procedure 500 may start at step 505, and continues to step 510, where, as described in greater detail above, the device may detect an anomaly in the network based on telemetry data obtained by the device. In various embodiments, the device uses a machine learning-based anomaly detector to detect the anomaly. In further embodiments, the telemetry data comprises at least one of: network traffic data, deep packet inspection (DPI) data, firewall event data, or traffic classification data.

At step 515, as detailed above, the device may compute an anomaly detection score associated with the anomaly. In some embodiments, the anomaly detection score is a non-binary score indicative of the extent to which the telemetry data differs from that of a baseline set of telemetry.

At step 520, the device may determine that the anomaly should be reported based on its anomaly detection score and in accordance with a configured reporting policy, as described in greater detail above. In some embodiments, the configured reporting policy specifies a resource budget that the device uses to assess whether the anomaly should be reported. In further embodiments, the configured reporting policy assigns a priority score to the anomaly detected by the device based on its anomaly detection score. In a further embodiment, the configured reporting policy assigns the priority score to the anomaly based further on an endpoint associated with the telemetry data. In another embodiment, the device may also receive the configured reporting policy from the cloud-hosted detection engine. In a further embodiment, the configured reporting policy may be specified via a user interface.

At step 525, as detailed above, the device may report anomaly information regarding the anomaly to a cloud-hosted detection engine that evaluates the anomaly information to confirm the anomaly detected by the device. In various embodiments, the cloud-hosted detection engine evaluates the anomaly information using an anomaly detection with greater detection performance than an anomaly detector used by the device to detect the anomaly. In some embodiments, the device may also receive an indication from the cloud-hosted detection engine indicative of whether it deemed the anomaly detected by the device as being anomalous.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for using cascaded detectors for prioritizing and optimizing data exports, it is to be understood that various other adaptations and modifications may be made within the spirit and scope of the embodiments herein. For example, while certain embodiments are described herein with respect to using certain models for purposes of predicting the traffic behaviors of certain devices, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

detecting, by a device in a network, a deviation in telemetry data as compared to a baseline of the network;

computing, by the device, an anomaly detection score indicating a likelihood that the deviation is an anomaly, wherein computing the anomaly detection score comprises applying a lower-power machine learning-based classifier to the telemetry data to generate a probabilistic output value that is indicative of a likelihood that the deviation corresponds to an anomaly that is a true anomaly based on historical labeled training data distinguishing true anomalies from false positives;

determining, by the device, that the deviation should be reported based on its anomaly detection score and in accordance with a configured reporting policy; and reporting, by the device, anomaly information including a sampled portion of the telemetry data regarding the deviation to a cloud-hosted detection engine that evaluates the anomaly information to confirm the anomaly detected by the device, wherein:

the cloud-hosted detection engine is in a cloud network that is remote from the network in which the device is located;

the cloud-hosted detection engine executes a higher-power machine learning model to confirm whether the deviation represents the true anomaly; and the higher-power machine learning model is a higher-power model as compared to the lower-power machine learning-based classifier.

2. The method as in claim 1, wherein the device uses a machine learning-based anomaly detector to detect the anomaly.

3. The method as in claim 1, wherein the telemetry data comprises at least one of: network traffic data, deep packet inspection (DPI) data, firewall event data, or traffic classification data.

4. The method as in claim 1, wherein the configured reporting policy specifies a resource budget that the device uses to assess whether the anomaly should be reported.

5. The method as in claim 1, wherein the cloud-hosted detection engine evaluates the anomaly information using an anomaly detection with greater detection performance than an anomaly detector used by the device to detect the anomaly.

6. The method as in claim 1, wherein the configured reporting policy assigns a priority score to the anomaly detected by the device based on its anomaly detection score.

7. The method as in claim 6, wherein the configured reporting policy assigns the priority score to the anomaly based further on an endpoint associated with the telemetry data.

8. The method as in claim 1, further comprising:

receiving, at the device, an indication from the cloud-hosted detection engine indicative of whether it deemed the anomaly detected by the device as being anomalous.

9. The method as in claim 1, wherein the device comprises a router or switch.

10. The method as in claim 1, further comprising:

receiving, at the device, the configured reporting policy from the cloud-hosted detection engine.

11. An apparatus, comprising:

one or more network interfaces to communicate with a network;

a processor coupled to the one or more network interfaces and configured to execute one or more processes; and a memory configured to store a process of the one or more processes that is executable by the processor, the process when executed configured to:

detect a deviation in telemetry data collected by the apparatus as compared to a baseline of the network by the apparatus;

compute an anomaly detection score indicating a likelihood that the deviation is an anomaly, wherein computing the anomaly detection score comprises applying a lower-power machine learning-based classifier to the telemetry data to generate a probabilistic output value that is indicative of a likelihood that the deviation corresponds to an anomaly that is a true anomaly based on historical labeled training data distinguishing true anomalies from false positives;

determine that the deviation should be reported based on its anomaly detection score and in accordance with a configured reporting policy; and report anomaly information including a sampled portion of the telemetry data regarding the deviation to a cloud-hosted detection engine that evaluates the anomaly information to confirm the anomaly detected by the apparatus, wherein:

the cloud-hosted detection engine is in a cloud network that is remote from the network in which the apparatus is located;

the cloud-hosted detection engine executes a higher-power machine learning model to confirm whether the deviation represents the true anomaly; and the higher-power machine learning model is a higher-power model as compared to the lower-power machine learning-based classifier.

12. The apparatus as in claim 11, wherein the apparatus uses a machine learning-based anomaly detector to detect the anomaly.

13. The apparatus as in claim 11, wherein the telemetry data comprises at least one of: network traffic data, deep packet inspection (DPI) data, firewall event data, or traffic classification data.

14. The apparatus as in claim 11, wherein the configured reporting policy specifies a resource budget that the apparatus uses to assess whether the anomaly should be reported.

15. The apparatus as in claim 11, wherein the cloud-hosted detection engine evaluates the anomaly information using an anomaly detection with greater detection performance than an anomaly detector used by the apparatus to detect the anomaly.

16. The apparatus as in claim 11, wherein the configured reporting policy assigns a priority score to the anomaly detected by the apparatus based on its anomaly detection score.

17. The apparatus as in claim 11, wherein the configured reporting policy is specified via a user interface.

18. The apparatus as in claim 11, wherein the anomaly information comprises the telemetry data.

19. The apparatus as in claim 11, wherein the apparatus comprises a router or switch.

20. A tangible, non-transitory, computer-readable medium storing program instructions that cause a device in a network to execute a process comprising:

detecting, by the device, a deviation in telemetry data collected by the device as compared to a baseline of the network;

computing, by the device, an anomaly detection score indicating a likelihood that the deviation is an anomaly, wherein computing the anomaly detection score comprises applying a lower-power machine learning-based classifier to the telemetry data to generate a probabilistic output value that is indicative of a likelihood that the deviation corresponds to an anomaly that is a true anomaly based on historical labeled training data distinguishing true anomalies from false positives;

determining, by the device, that the deviation should be reported based on its anomaly detection score and in accordance with a configured reporting policy; and reporting, by the device, anomaly information including a sampled portion of the telemetry data regarding the deviation to a cloud-hosted detection engine that evaluates the anomaly information to confirm the anomaly detected by the device, wherein:

the cloud-hosted detection engine is in a cloud network that is remote from the network in which the device is located;

the cloud-hosted detection engine executes a higher-power machine learning model to confirm whether the deviation represents the true anomaly; and the higher-power machine learning model is a higher-power model as compared to the lower-power machine learning-based classifier.

* * * * *